(12) United States Patent
Geirhofer et al.

(10) Patent No.: US 9,698,887 B2
(45) Date of Patent: Jul. 4, 2017

(54) SYSTEMS AND METHODS FOR ENHANCED MIMO OPERATION

(71) Applicant: QUALCOMM Incorporated, San Diego, CA (US)

(72) Inventors: Stefan Geirhofer, Brooklyn, NY (US); Peter Gaal, San Diego, CA (US); Wanshi Chen, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/199,743

(22) Filed: Mar. 6, 2014

(65) Prior Publication Data

US 2014/0254701 A1    Sep. 11, 2014

Related U.S. Application Data

(60) Provisional application No. 61/775,016, filed on Mar. 8, 2013, provisional application No. 61/821,867, filed on May 10, 2013, provisional application No. 61/832,310, filed on Jun. 7, 2013.

(51) Int. Cl.
*H04L 1/02* (2006.01)
*H04B 7/06* (2006.01)
*H04B 7/04* (2017.01)

(52) U.S. Cl.
CPC ......... *H04B 7/0626* (2013.01); *H04B 7/0469* (2013.01); *H04B 7/0478* (2013.01); *H04B 7/0639* (2013.01); *H04B 7/0647* (2013.01); *H04B 7/0695* (2013.01)

(58) Field of Classification Search
CPC .. H04B 7/0639; H04B 7/0626; H04B 7/0417; H04B 7/0456; H04B 7/0632; H04B 7/0478; H04B 7/0413; H04B 7/0621; H04L 5/0057
USPC ........ 370/329, 252; 375/267, 299, 316, 340, 375/347
See application file for complete search history.

(56) References Cited

U.S. PATENT DOCUMENTS

| | | | |
|---|---|---|---|
| 2011/0305263 A1 | 12/2011 | Jöngren et al. | |
| 2012/0140649 A1* | 6/2012 | Choudhury | H04W 24/10 370/252 |
| 2012/0218948 A1* | 8/2012 | Onggosanusi et al. | 370/329 |
| 2012/0219042 A1* | 8/2012 | Onggosanusi et al. | 375/219 |

(Continued)

FOREIGN PATENT DOCUMENTS

GB    2492564 A    1/2013

OTHER PUBLICATIONS

International Search Report and Written Opinion—PCT/US2014/021911—ISA/EPO—May 30, 2014.

(Continued)

*Primary Examiner* — Leila Malek
(74) *Attorney, Agent, or Firm* — Austin Rapp & Hardman

(57) ABSTRACT

A method for channel state information (CSI) reporting by a wireless communication device is described. The method includes determining a codebook for a CSI report corresponding to four transmit antenna (4Tx) transmissions from a base station. The codebook has a dual codebook structure. The method also includes generating the CSI report using the codebook. The method further includes transmitting the CSI report to a base station.

16 Claims, 8 Drawing Sheets

(56) References Cited

U.S. PATENT DOCUMENTS

2012/0314590 A1* 12/2012 Choudhury et al. .......... 370/252
2014/0177745 A1*  6/2014 Krishnamurthy et al. ... 375/267

OTHER PUBLICATIONS

3GPP TS 36.213 v11.2.0 (Feb. 2013), 3rd Generation Partnership Project; Technical Specification Group Radio Access Network; Evolved Universal Terrestrial Radio Access (E-UTRA); Physical layer procedures (Release 11), 173 pp.
Alcatel-Lucent, et al., "Way Forward on 8Tx Codebook for Rel. 10 DL MIMO," 3GPP TSG RAN WG1 62, Madrid, Spain, Aug. 23-27, 2010, R1-105011, 6 pages.

\* cited by examiner

SYSTEMS AND METHODS FOR ENHANCED MIMO OPERATION

RELATED APPLICATIONS

This application is related to and claims priority from U.S. Provisional Patent Application Ser. No. 61/775,016, filed Mar. 8, 2013, for "CODEBOOK DESIGN AND CSI FEEDBACK FOR ENHANCED MIMO OPERATION IN LTE." This application is also related to and claims priority from U.S. Provisional Patent Application Ser. No. 61/821,867, filed May 10, 2013, for "CODEBOOK DESIGN AND CSI FEEDBACK FOR ENHANCED MIMO OPERATION IN LTE." This application is also related to and claims priority from U.S. Provisional Patent Application Ser. No. 61/832,310, filed Jun. 7, 2013, for "CODEBOOK DESIGN AND CSI FEEDBACK FOR ENHANCED MIMO OPERATION IN LTE."

TECHNICAL FIELD

The present disclosure relates generally to wireless communication systems. More specifically, the present disclosure relates to systems and methods for codebook design and channel state information (CSI) feedback for enhanced multiple-input and multiple-output (MIMO) operation in Long Term Evolution (LTE).

BACKGROUND

Wireless communication systems are widely deployed to provide various types of communication content such as voice, video, data, and so on. These systems may be multiple-access systems capable of supporting simultaneous communication of one or more wireless communication devices with one or more base stations.

A problem that must be dealt with in all communication systems is interference. There may be problems with decoding the signals received. In wireless communication, one way to deal with these problems is by utilizing channel state information (CSI) feedback. As part of channel state information (CSI) feedback, a wireless communication device may send channel quality indicator (CQI) values to one or more base stations. The one or more base stations may use the channel quality indicator (CQI) values to schedule wireless transmissions.

The use of codebooks allows a wireless communication device to indicate to a base station the format of channel state information (CSI) feedback. Different codebooks can provide different benefits. For example, some codebooks provide increased payloads, some provide high feedback accuracy and some codebooks provide low overhead. Benefits may be realized by using adaptive codebooks for channel state information (CSI) feedback.

SUMMARY

A method for channel state information (CSI) reporting is described. The method includes determining a codebook for a CSI report corresponding to four transmit antenna (4Tx) transmissions from a base station. The codebook has a dual codebook structure. The method also includes generating the CSI report using the codebook. The method further includes transmitting the CSI report to a base station.

The dual codebook structure may be a block-diagonal grid of beams structure. A first matrix may define a grid of beams for each polarization. A second matrix may perform beam selection within a beam group and co-phasing.

The codebook may be determined based on at least one of a grid of beam resolution, a size of the beam groups, an overlap between beam groups, and a co-phasing accuracy. Each of the parameters may be individually adaptable to form the codebook.

The method may also include signaling the codebook using signaling based on at least one of explicit bits, dynamic parameters and semi-static parameters. New reporting types may be defined to adjust the number of bits spent for a precoding matrix indicator (PMI) or a channel quality indicator (CQI) in various reporting modes.

The method may be performed by a wireless communication device. The wireless communication device may determine which of multiple configured codebooks should be used for CSI reporting.

Multiple user channel quality indicator hypotheses may remain separate from codebook adaptation. Multiple user channel quality indicator hypotheses may follow codebook adaptation. The method may also include performing codebook subsampling to meet an 11 bit payload constraint for the CSI report.

A method for CSI reporting by a base station is also described. The method includes determining a codebook used by a wireless communication device for a CSI report corresponding to 4Tx transmissions from the base station. The codebook has a dual codebook structure. The method also includes receiving the CSI report. The method further includes decoding the CSI report using the codebook.

A wireless communication device for CSI reporting is also described. The wireless communication device includes a processor, memory in electronic communication with the processor and instructions stored in the memory. The wireless communication device determines a codebook for a CSI report corresponding to 4Tx transmissions from a base station. The codebook has a dual codebook structure. The wireless communication device generates the CSI report using the codebook. The wireless communication device transmits the CSI report to a base station.

A base station for CSI reporting is also described. The base station includes a processor, memory in electronic communication with the processor and instructions stored in the memory. The base station determines a codebook used by a wireless communication device for a CSI report corresponding to 4Tx transmissions from the base station. The codebook has a dual codebook structure. The base station receives the CSI report. The base station decodes the CSI report using the codebook.

A wireless communication device for CSI reporting is also described. The wireless communication device includes means for determining a codebook for a CSI report corresponding to 4Tx transmissions from a base station. The codebook has a dual codebook structure. The wireless communication device also includes means for generating the CSI report using the codebook. The wireless communication device further includes means for transmitting the CSI report to a base station.

A base station for CSI reporting is also described. The base station includes means for determining a codebook used by a wireless communication device for a CSI report corresponding to 4Tx transmissions from the base station. The codebook has a dual codebook structure. The base station also includes means for receiving the CSI report. The base station further includes means for decoding the CSI report using the codebook.

A computer-program product for CSI reporting is also described. The computer-program product includes a non-transitory computer-readable medium having instructions thereon. The instructions include code for causing a wireless communication device to determine a codebook for a CSI report corresponding to 4Tx transmissions from a base station. The codebook has a dual codebook structure. The instructions also include code for causing the wireless communication device to generate the CSI report using the codebook. The instructions further include code for causing the wireless communication device to transmit the CSI report to a base station.

A computer-program product for CSI reporting is also described. The computer-program product includes a non-transitory computer-readable medium having instructions thereon. The instructions include code for causing a base station to determine a codebook used by a wireless communication device for a CSI report corresponding to 4Tx transmissions from the base station. The codebook has a dual codebook structure. The instructions also include code for causing the base station to receive the CSI report. The instructions further include code for causing the base station to decode the CSI report using the codebook.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

The systems and methods disclosed herein may be described with reference to one or more specifications, such as 3GPP Release-8, 3GPP Release-9, 3GPP Release-10, 3GPP Release-11, 3GPP Release-12, LTE and Long Term Evolution Advanced (LTE-A). However, the concepts may also be applied to other wireless communication systems.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
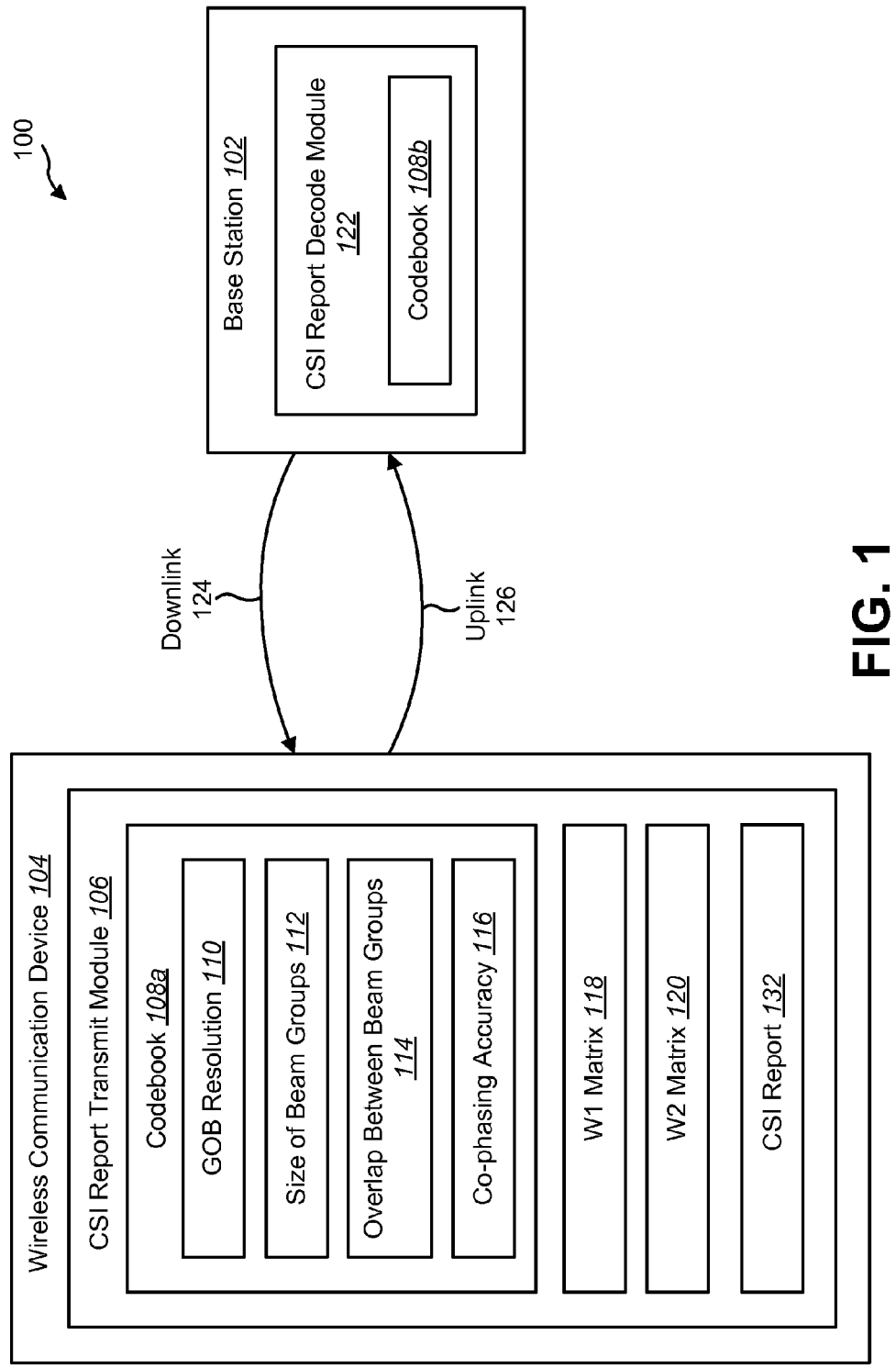
FIG. 1 shows a wireless communication system with multiple wireless devices in which systems and methods for enhanced MIMO operation may be performed.

FIG. 1 shows a wireless communication system 100 with multiple wireless devices in which systems and methods for enhanced MIMO operation may be performed. Wireless communication systems 100 are widely deployed to provide various types of communication content such as voice, data, and so on. A wireless device may be a wireless communication device 104 or a base station 102. Both the wireless communication device 104 and the base station 102 may be configured to use a multiple codebook 108 procedure.

A base station 102 is a station that communicates with one or more wireless communication devices 104. A base station 102 may also be referred to as, and may include some or all of the functionality of, an access point, a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area depending on the context in which the term is used.

A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc.

Communications in a wireless system (e.g., a multiple-access system) may be achieved through transmissions over a wireless link. Such a communication link may be established via a single-input and single-output (SISO), multiple-input and single-output (MISO), multiple-input and multiple-output (MIMO), or a coordinated multipoint (CoMP) system. A MIMO system includes transmitter(s) and receiver(s) equipped, respectively, with multiple (NT) transmit antennas and multiple (NR) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink 126 and downlink 124 transmissions are on the same frequency region so that the reciprocity principle allows the estimation of the downlink 124 channel from the uplink 126 channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, 3$^{rd}$ Generation Partnership Project (3GPP) Long Term Evolution (LTE) systems and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). For clarity, certain aspects of the techniques are described below for LTE, and LTE terminology is used in much of the description below.

A wireless communication device 104 may communicate with zero, one, or multiple base stations 102 on the downlink 124 and/or uplink 126 at any given moment. Multiple channels may be used between a base station 102 and a wireless communication device 104 on both the downlink 124 and the uplink 126. A physical uplink shared channel (PUSCH) may be used to transmit user data from a wireless communication device 104 to a base station 102. A physical uplink control channel (PUCCH) may be used to transport user signaling data from a wireless communication device 104 to a base station 102. A physical downlink shared channel (PDSCH) may be used to transmit common user data and control information from a base station 102 to a wireless communication device 104. A physical downlink control channel (PDCCH) may be used to transmit control information from a base station 102 to a wireless communication device 104.

Based on communications received from one or more base stations 102, a wireless communication device 104 may generate one or more types of channel state information (CSI), such as channel quality indicators (CQIs), precoding matrix indicators (PMIs) and rank indicators (RIs). Each channel quality indicator (CQI) may be associated with a channel measurement for the downlink 124 channel between the base station 102 and the wireless communication device 104. Each channel quality indicator (CQI) may be conditioned on certain interference assumptions. A channel quality indicator (CQI) may be dependent on the transmission scheme used in the wireless communications system.

A wireless communication device 104 may use the CSI feedback information to determine a preferred beam. A preferred beam may refer to the antenna structure, weight, transmission direction and phase of a signal transmitted by a base station 102 to the wireless communication device 104. The terms "beam" and "precoding vector" may refer to the direction in which data is streamed wirelessly from an antenna. In multiple-input and multiple-output (MIMO), multiple beams may be used to transmit information between a base station 102 and a wireless communication device 104. A preferred beam may thus refer to a beam that produces the best (i.e., the optimal) data stream between the base station 102 and the wireless communication device 104.

Multi-user multiple-input and multiple-output (MU-MIMO) may increase user throughputs on the downlink 124 over traditional single-user multiple-input and multiple-output (SU-MIMO) by making more intelligent use of the base station 102 resources. Multi-user multiple-input and multiple-output (MU-MIMO) may enable an increase in throughput for a particular transmission time interval (TTI) compared with dual-stream transmission to a single wireless communication device 104. A base station 102 may thus determine whether to use dual downlink 124 data streams for a single wireless communication device 104 (i.e., SU-MIMO) or to use a first data stream for a first wireless communication device 104 and a second data stream (e.g., orthogonal to the first data stream) for a second wireless communication device 104 (i.e., multi-user multiple-input and multiple-output (MU-MIMO)).

The CSI feedback information may correspond to a request for a single-stream transmission or a dual-stream transmission. For example, a wireless communication device 104 may include multiple channel quality indicators (CQIs). The wireless communication device 104 may generate multiple channel quality indicators (CQIs) for each transmission time interval (TTI). A wireless communication device 104 may not send every channel quality indicator (CQI) to the base station 102 for every transmission time interval (TTI). In some configurations, a wireless communication device 104 may send only the optimal channel quality indicator (CQI) to the base station 102 for each transmission time interval (TTI).

If the wireless communication device 104 determines that it has good geometry with respect to the base station 102 (e.g., the channel quality between the base station 102 and the wireless communication device 104 is above a threshold), the wireless communication device 104 may send an optimal dual-stream multiple-input and multiple-output (MIMO) channel quality indicator (CQI) to the base station 102. If the wireless communication device 104 determines that it has bad geometry with respect to the base station 102 (e.g., the channel quality between the base station 102 and the wireless communication device 104 is below the threshold), the wireless communication device 104 may send an optimal single-stream multiple-input and multiple-output (MIMO) channel quality indicator (CQI) to the base station 102.

The wireless communication device 104 may include a CSI report transmit module 106. The CSI report transmit module 106 may generate CSI reports 132 and transmit these CSI reports 132 to the base station 102. Since these CSI reports 132 provide the base station 102 with information about the downlink 124 channel from the base station 102 to the wireless communication device 104 using MIMO, these CSI reports 132 may be referred to as DL MIMO CSI feedback. DL MIMO CSI feedback may be reported periodically or aperiodically.

The wireless communication device 104 may use a codebook 108a (a set of pre-agreed parameters) for each CSI report 132. The codebook 108a may instruct the base station 102 on how to interpret a received CSI report 132, including what information is included in the CSI report 132 and the formatting of the CSI report 132.

The codebook 108 may have different structures depending on the number transmit antennas that are used by the base station 102. The codebook 108 structure for 8Tx (i.e., eight transmit antennas used by the base station 102) has been defined. This codebook 108 structure defines a dual codebook 108 structure tailored to cross-polarized (X-pol)

antenna structures. This structure is motivated by a preference from operators and by the large form factor of 8Tx-ULA (uniform linear array).

The codebook 108 structure for 8Tx defines a block diagonal grid of beams (GoB) structure W=W$_1$·W$_2$. In one configuration, W$_1$ may correspond to properties for a long-term and/or wideband channel and W$_2$ may correspond to properties for a short-term and/or narrowband channel.

In the GoB structure, the W$_1$ matrix 118 is an 8×2N$_b$ matrix defined as $$W_1 = \begin{bmatrix} X & 0 \\ 0 & X \end{bmatrix}.$$

Within the W$_1$ matrix 118, X is a 4×N$_b$ matrix defining the GoB for each polarization. N$_b$ represents the number of beams within a beam group. Since the W$_1$ matrix 118 is reported only for wideband, having multiple overlapping beam groups per W$_1$ matrix 118 allows the W$_2$ matrix 120 to select among the optimal beams within the beam group on a per-subband basis. The W$_2$ matrix 120 is a 2N$_b$×r matrix. The W$_2$ matrix 120 performs beam selection within the beam group and co-phasing. In W$_2$, r denotes the selected transmission rank.

However, a dual codebook 108 structure that includes the W$_1$ matrix 118 and the W$_2$ matrix 120 (as are used in the 8Tx case) has not been defined for 4Tx (i.e., four transmit antennas used by the base station 102). In one configuration, the codebook 108 structure for 4Tx may retain the block-diagonal GoB structure that has been defined for 8Tx. Thus, the W$_1$ matrix 118 may be a 4×2N$_b$ matrix defined as $$W_1 = \begin{bmatrix} X & 0 \\ 0 & X \end{bmatrix}.$$

Within the W$_1$ matrix 118, X may be a 2×N$_b$ matrix defining the GoB for each polarization. The W$_2$ matrix 120 may be a 2N$_b$×r matrix. The benefits of using the same block-diagonal GoB structure for 4Tx as is used for 8Tx is that the codebook 108 structure remains tailored to X-pol deployments, which are an important scenario in practice. Additionally, overlapping beam groups have the benefit that a single W$_1$ matrix 118 can be optimal across the entire system bandwidth (overlap avoids edge effect).

A dual codebook 108 that includes the W$_1$ matrix 118 and the W$_2$ matrix 120 may be defined as a function of one or more parameters. These parameters may include the GoB resolution 110, the size of the beam groups 112, the overlap between beam groups 114 and the co-phasing accuracy 116 (e.g., the impact of the W$_2$ payload).

When selecting a codebook 108 (and the parameters used for the codebook 108), two tradeoffs should be considered. The first tradeoff is general accuracy vs. feedback overhead. The computation aspects of the wireless communication device 104 also need to be considered. The second tradeoff is a W$_1$ vs. W$_2$ payload tradeoff. W$_1$ is reported wideband but W$_2$ is reported subband.

The parameters used for generating the codebook 108 should be reconsidered when going from 8Tx to 4Tx. By using an adaptable codebook 108, each of the parameters in the codebook 108 can be configured independently (referred to herein as codebook adaptation). Codebook adaptation avoids having to compromise across different antenna configurations and/or channel conditions (e.g., line of sight (LoS) vs. non-line of sight (NLoS)). Codebook adaptation may involve any of the parameters in the codebook 108 (i.e., the GoB resolution 110, the size of beam groups 112, the overlap between beam groups 114 and the co-phasing accuracy 116). Codebook adaptation may also include the selection of codebooks 108 with different structures (e.g., legacy 4Tx codebooks 108) for which the aforementioned parameters may not be relevant.

Design alternatives for codebook 108 parameter optimization are given below in Table 1 (however, other parameter combinations may also be considered):

TABLE 1

| Codebook Parameter | Design Alternatives | | | | | |
|---|---|---|---|---|---|---|
| GoB Resolution | 64 | 32 | 16 | 16 | 16 | 8 |
| Number of beam groups | 32 | 16 | 8 | 16 | 16 | 8 |
| Number of beams within each beam group | 4 | 4 | 4 | 2 | 1 | 1 |
| Overlap between beam groups | 2 | 2 | 2 | 1 | 0 | 0 |
| Number of Co-phasing choices (W$_2$) | 4 | 4 | 4 | 4 | 4 | 4 |
| W$_1$ payload | 5 bit | 4 bit | 3 bit | 4 bit | 4 bit | 3 bit |
| W$_2$ payload | 4 bit | 4 bit | 4 bit | 3 bit | 2 bit | 2 bit |

In one example, codebook adaptation may support two parameter sets: one parameter set may be tailored to high feedback accuracy and one parameter set may be tailored to low overhead. Codebook adaptation may also consider switching between the legacy Rel-8 Householder (HH) codebook 108 and the enhanced dual codebook 108 according to the systems and methods described herein. The Rel-8 codebook 108 may be sufficient for rank-3 and rank-4 operation. In this case, it may be desirable to report the precoding matrix only on wideband to reduce the feedback overhead for higher ranks.

As discussed above, the block diagonal GoB structure W=W1·W2 may be used for a dual codebook 108 structure for 4Tx. Thus, the CSI report 132 may include indices corresponding to a W$_1$ matrix 118 and a W$_2$ matrix 120, respectively. The CSI report 132 may be provided to a base station 102. The base station 102 may include a CSI report decode module 122. The CSI report decode module 122 may be used by the base station 102 to receive a CSI report 132 and decode the CSI report 132 using the appropriate codebook 108b. In some configurations, the CSI report decode module 122 may also signal to the wireless communication device 104 which codebook 108b the wireless communication device 104 is to use.

In one configuration, the codebooks 108b may be explicitly defined. For example, the specification may include a listing of each codebook 108 explicitly. One or more codebooks 108 may be defined, allowing for codebook adaptation. In other words, the codebook 108 parameters may be defined explicitly.

In another configuration, the codebook 108 parameters may be signaled explicitly (rather than using preset codebooks 108). The set of parameters corresponding to the codebook 108 may be defined and these defined parameters may be signaled (e.g., through RRC signaling) for each codebook 108. This allows greater flexibility, as presumably any combination of codebook 108 parameters could be allowed. However, this has the drawback of increased wireless communication device 104 complexity of managing a potentially greater number of codebooks 108. Some parameter combinations could be reserved and associated with predefined codebook 108 structures. For example, the legacy 4Tx Rel-8 LTE codebook 108 may be used.

In transmission mode 10 (TM10), multiple CSI processes are supported. Each CSI process may correspond to specific channel and interference hypotheses. Multiple signaling options may be considered. In a first signaling option, the codebook 108 may be common across all configured CSI processes. This is simple but inflexible. In a second signaling option, a single codebook 108 can be configured for each CSI process. The configuration of a codebook 108 per CSI process enables the network to report CSI for different transmission points with different accuracy levels. This scalable feedback may be beneficial, since different tradeoffs in terms of CSI accuracy vs. uplink 126 overhead may be achievable.

In a third signaling option, one or more codebooks 108 can be configured for each CSI process. This allows for dynamic selection of one codebook 108 among the configured codebooks 108. The codebook 108 may be signaled using dynamic signaling based on explicit bits, implicit signaling based on dynamic parameters or implicit signaling based on semi-static parameters.

For dynamic signaling based on explicit bits, new bits may be defined in the downlink control information (DCI) to signal which of the one or more codebooks 108 should be selected. Existing but unused code points (defined by the existing DCI bits) may also be used equivalently. Some form of broadcast signaling may also be used. The use of broadcast signaling is motivated by the fact that it may be beneficial for multiple wireless communication devices 104 to use the same codebook 108 (e.g., for improved multiple user multiple-input and multiple-output (MU-MIMO) operation). It also may be beneficial to switch a large number of wireless communication devices 104 at the same time. Broadcast signaling may save signaling overhead.

For implicit signaling based on dynamic parameters, the entries in the sets identifying which CSI process to report upon receiving a specific CSI request field (i.e., the sets linked to the aperiodic CSI triggering table) may be amended to identify which CSI process to report and which codebook 108 to use. The codebook 108 selected may be associated with one or more parameters: a subframe subset associated with the CSI report 132 and/or parameters of the DCI triggering the report (e.g., received on common or wireless communication device-specific search space, received through legacy PDCCH or an enhanced PDCCH (EPDCCH)).

For implicit signaling based on semi-static parameters, different codebooks 108 may be used for periodic vs. aperiodic reporting of a CSI process. For example, a high-accuracy codebook 108 may be used for aperiodic reporting while a low granularity codebook 108 may be used for periodic reporting. Selection of a specific codebook 108 may also be tied to the periodic/aperiodic reporting mode.

The use of codebook adaptation may lead to variable uplink 126 overhead, which may be taken into account as part of encoding/reporting details on the uplink 126. In the case of aperiodic feedback, the encoding of PMI and CQI can follow the same concatenation rules as used in Rel-11. In this case, the network is aware of the codebook 108 used and can decode the received CSI report 132 without issues.

For periodic CSI feedback, new reporting types may be defined to adjust the number of bits spent for PMI and/or CQI in various reporting modes. If separate reporting types for each codebook 108 are not defined, additional steps may be taken. For example, if the PMI and/or the CQI bit-width is smaller than the corresponding reporting type, zero-padding may be performed. The location of zeros may be known to the network; the network may use the location of zeros as a form of virtual cyclic redundancy check (CRC). By not defining separate reporting types for each codebook 108, fewer reporting types need to be defined, which is an added benefit. Periodic CSI feedback and reporting types are discussed in more detail in connection with FIG. 5.

The wireless communication device 104 may provide assistance in helping the network determine which codebook 108 should be selected/configured. If codebook adaptation is supported per CSI processes, multiple CSI processes can be configured for the wireless communication device 104. The multiple CSI processes may have the same channel and interference configuration, but different codebook 108 configurations. In one configuration, the wireless communication device 104 may generate a CSI report 132 for each codebook 108. The network may receive the CSI reports 132 for each codebook 108 and then determine which codebook 108 is better suited for CSI reporting. This may be transparent to the wireless communication device 104.

In one configuration, the wireless communication device 104 may determine which of multiple configured (i.e., candidate) codebooks 108 should be used for CSI reporting. The wireless communication device 104 may inform the network of the selected codebook 108 through some form of codebook type indicator (CTI). The wireless communication device 104 may determine the codebook 108 to select, at least in part, based on downlink 124 vs. uplink 126 traffic characteristics (e.g., is the downlink 124 gain worth the additional uplink 126 overhead?), battery saving considerations (e.g., how is the battery life affected by having large/small uplink 126 overhead?), channel statistics (e.g., how does frequency/time selectivity of the channel impact anticipated CSI feedback accuracy?), and quantization accuracy (e.g., does one codebook 108 lead to much smaller quantization error than another?). The network may also provide signaling or other assistance to help the wireless communication device 104 in making the codebook 108 selection.

Multiple user CQI (MU-CQI) feedback may be performed with Rel-8 4Tx codebooks 108. Wideband MU-CQI offsets may be computed under a set of hypotheses for a co-scheduled layer. For example, each hypothesis can be associated with a rank-1 precoder in the codebook 108. Different hypotheses may be considered and the co-scheduled precoder may be obtained, at least in part, based on the selected PMI of the desired layer. The number of different hypotheses and the number of co-scheduled precoders that are obtained may be represented by the value K. The desired layer and the MU-MIMO related information is given for different ranks in Table 2 below:

TABLE 2

| | RI = 1 | RI = 2 |
|---|---|---|
| Desired Layer | PMI (wb; rank-1) SU-CQI (sb; rank-1) | PMI (wb; rank-2) SU-CQI (sb; rank-2) |
| MU-MIMO-related information | MU-CQI offsets (wb) for the set of K co-scheduled PMIs | PMI (wb; rank-1) SU-CQI (wb; rank-1) MU-CQI offsets (wb) for the set of K co-scheduled PMIs |

In Table 2, "SU-CQI" represents a single-user channel quality indicator. Furthermore, "wb" represents information that is reported wideband, and "sb" represents information that is reported subband.

MU-CQI feedback may be configured in addition to codebook adaptation. In one configuration, the MU-CQI hypotheses may remain separate from the codebook adaptation. Thus, the codebook 108 used to emulate co-scheduled layers (of other wireless communication devices 104) may use a fixed codebook 108, which may be different from the codebook 108 that the wireless communication device 104 uses for CSI feedback. In another configuration, the MU-CQI hypotheses may follow the codebook adaptation described herein. Thus, a set of MU-CQI hypotheses may be defined for each codebook 108. When the wireless communication device 104 switches codebooks 108, the wireless communication device 104 may also switch assumptions on how the MU-CQI hypotheses are defined.

The MU-CQI hypotheses may be defined based on the $W_1$ matrix 118 selection only. It may not be necessary to have separate hypotheses for different $W_2$ matrices 120 associated with the same $W_1$ matrix 118. This results in a smaller number of hypotheses that need to be considered. The co-scheduled $W_1$ matrix 118, which is used for MU-CQI computation, may be selected, at least in part, based on the $W_1$ matrix 118 determined for the desired layer of the wireless communication device 104. For example, MU-MIMO may be performed by choosing quasi-orthogonal wireless communication devices 104 in the $W_1$ matrix 118 domain.

Figure 2:
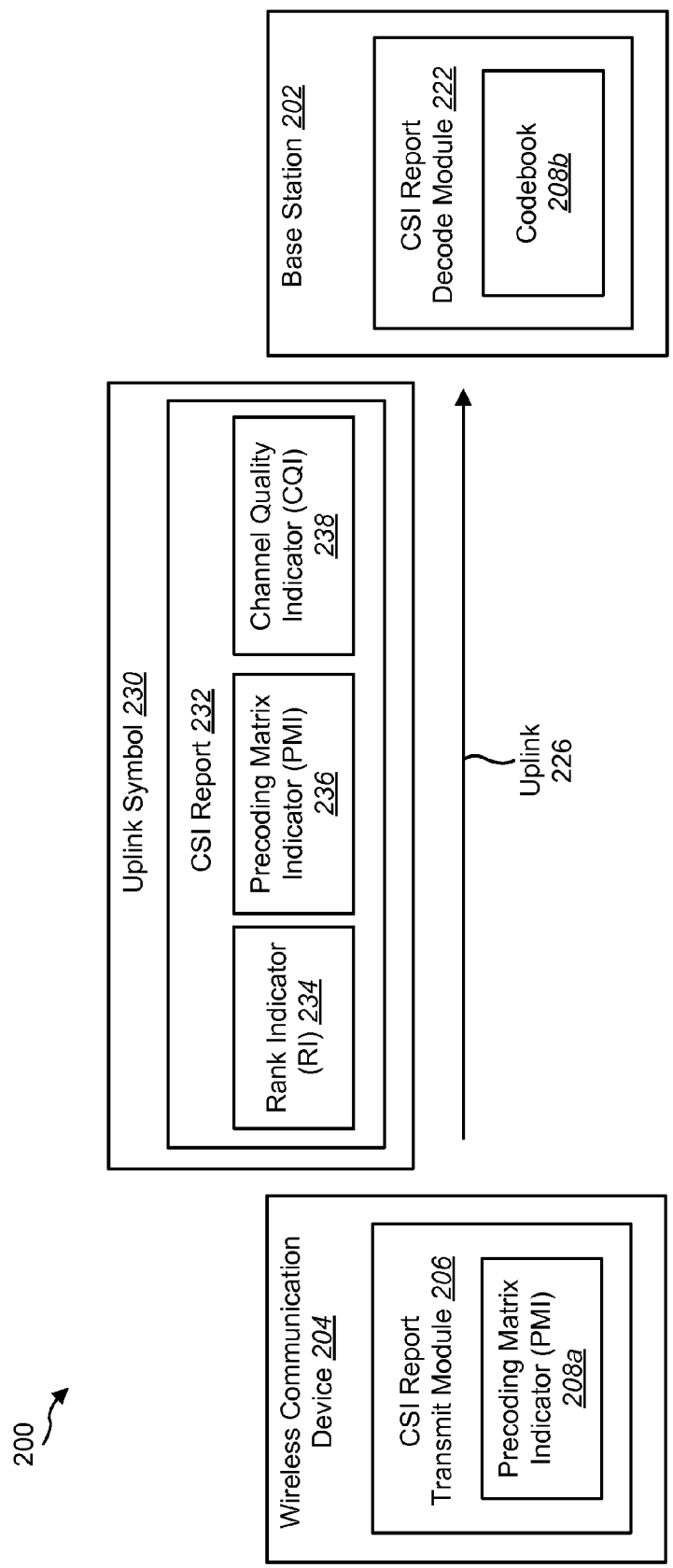
FIG. 2 is a block diagram illustrating a radio network operating in accordance with the systems and methods disclosed herein.

FIG. 2 is a block diagram illustrating a radio network 200 operating in accordance with the systems and methods disclosed herein. The network 200 may include one or more wireless communication devices 204 and one or more base stations 202. The wireless communication device 204 may operate in accordance with the wireless communication device 104 described in connection with FIG. 1. Furthermore, the base station 202 may operate in accordance with the base station 102 described in connection with FIG. 1.

In one configuration, the wireless communication device 204 may include a CSI report transmit module 206. The CSI report transmit module may create a CSI report 232 based on a codebook 208a. The wireless communication device 204 may send the CSI report 232 in an uplink symbol 230 to a base station 202. The wireless communication device 204 may send the uplink symbol 230 on the uplink 226. In one configuration, the uplink symbol 230 is sent on a physical uplink shared channel (PUSCH) or a physical uplink control channel (PUCCH).

The uplink symbol 230 may include channel state information (CSI) that may be used by the base station 202 to schedule wireless transmissions. In one configuration, the uplink symbol 230 may include a channel state information (CSI) report 232. The channel state information (CSI) report 232 may include a combination of channel quality indicator (CQI) information 238, precoding matrix indicator (PMI) information 236 and rank indicator (RI) information 234.

The rank indicator (RI) 234 may indicate the number of layers that can be supported on a channel (e.g., the number of layers that the wireless communication device 204 can distinguish). Spatial multiplexing (in a MIMO transmission, for example) can be supported only when the rank indicator (RI) 234 is greater than 1. The precoding matrix indicator (PMI) 236 may indicate a precoder out of a codebook 208 (e.g., pre-agreed parameters) that the base station 202 may use for data transmission over multiple antennas based on the evaluation by the wireless communication device 204 of a received reference signal.

The codebook 208 may instruct the base station 202 on how to interpret a received CSI report 232, including what information is included in the CSI report 232 and the formatting of the CSI report 232. For example, the CSI report module 206 may determine a codebook 208a for the CSI report 232 corresponding to four transmit antenna (4Tx) transmissions from a base station 202. In one configuration, the codebook 208a may have a dual codebook structure. The codebook 208a structure may be a block-diagonal grid of beams (GoB) structure, as described in connection with FIG. 1.

The CSI report module 206 may adapt the codebook 208 based on one or more parameters. For example, the CSI report module 206 may adapt the codebook 208 based on GoB resolution 110, the size of the beam groups 112, the overlap between beam groups 114 and/or the co-phasing accuracy 116. The codebook adaptation may be performed to balance the accuracy and feedback overhead of the CSI report 232.

The base station 202 may include a CSI report decode module 222. The base station 202 may receive the CSI report 232. The CSI report decode module 222 may determine the codebook 208 used to generate the CSI report 232. The base station 202 may decode the CSI report 232 based on the codebook 208b.

Figure 3:
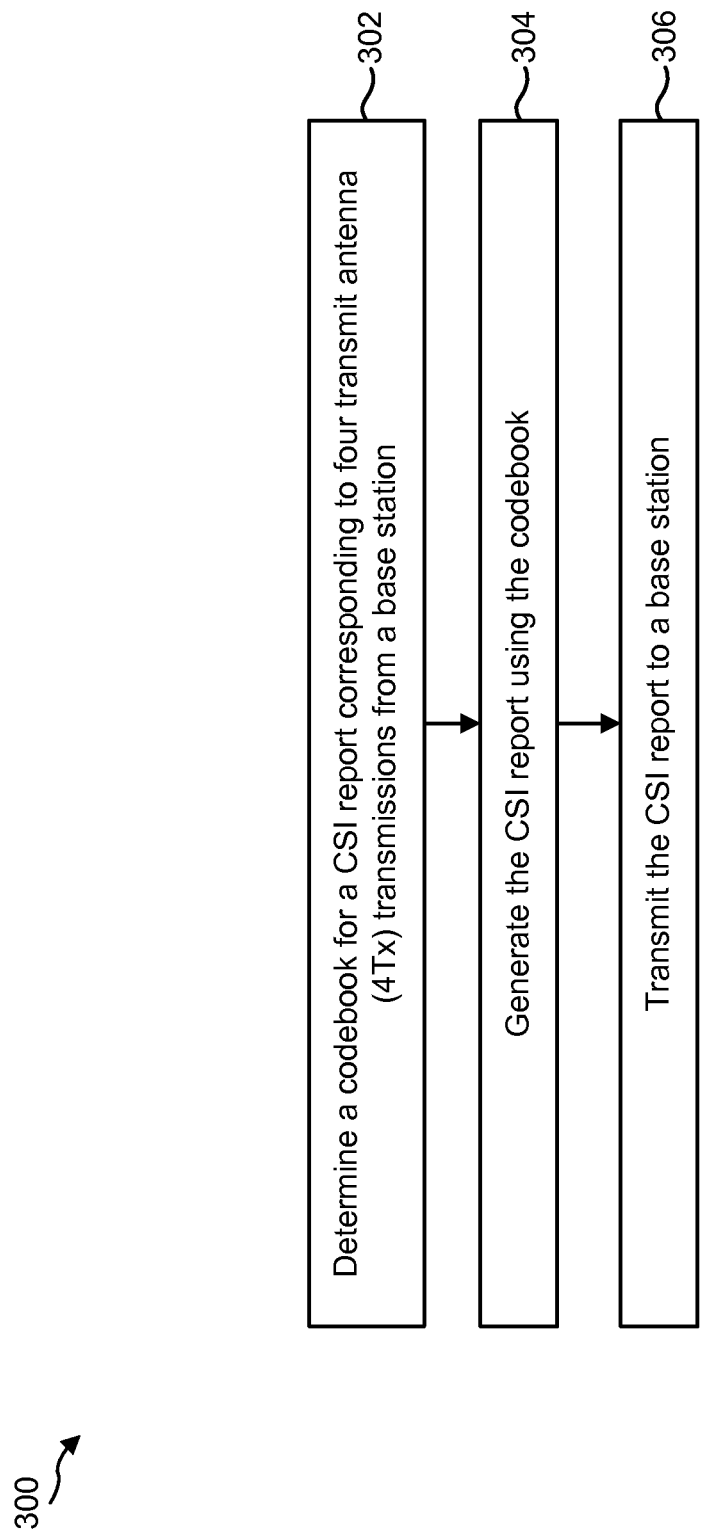
FIG. 3 is a flow diagram of a method for CSI reporting using codebook adaptation.

FIG. 3 is a flow diagram of a method 300 for CSI reporting using codebook adaptation. The method 300 may be performed by a wireless communication device 104. In one configuration, the wireless communication device 104 may provide CSI reports 132 that correspond to 4Tx downlink 124 transmissions from a base station 102 to the wireless communication device 104. Codebook adaptation may allow the wireless communication device 104 to use one or more codebooks 108.

The wireless communication device 104 may determine 302 a codebook 108 for a CSI report 132. In one configuration, the codebook 108 may have a dual codebook structure. For example, the codebook 108 may have a block-diagonal grid of beams (GoB) structure. A first matrix (e.g., the W1 matrix 118) may define a grid of beams for each polarization. A second matrix (e.g., the W2 matrix 120) may perform beam selection within a beam group and co-phasing.

The codebooks 108 used by the wireless communication device 104 may be predefined. For example, the wireless communication device 104 may include two or more codebooks 108, along with the parameters associated with each codebook 108. The codebooks 108 used by the wireless communication device 104 may instead be adaptable. Thus, the wireless communication device 104 may adjust any of the parameters of a codebook 108 to obtain an adapted codebook 108. The parameters of a codebook 108 may include the GoB resolution 110, the size of the beam groups 112, the overlap between beam groups 114 and/or the co-phasing accuracy 116. Each of the parameters may be individually adaptable to form the codebook 108.

As discussed above, the wireless communication device 104 may autonomously select the codebook 108. Alternatively, the wireless communication device 104 may receive signaling from the base station 102 on which codebook 108 to select. In one configuration, the wireless communication device 104 may use multiple codebooks 108 for multiple CSI reports 132 and the base station 102 may indicate to the wireless communication device 104 which codebook 108 provides the most benefit. The codebook 108 may be signaled using signaling based on explicit bits, dynamic parameters and/or semi-static parameters.

The wireless communication device 104 may generate 304 the CSI report 132 using the codebook 108. The wireless communication device 104 may then transmit 306 the CSI report 132 to a base station 102.

Figure 4:
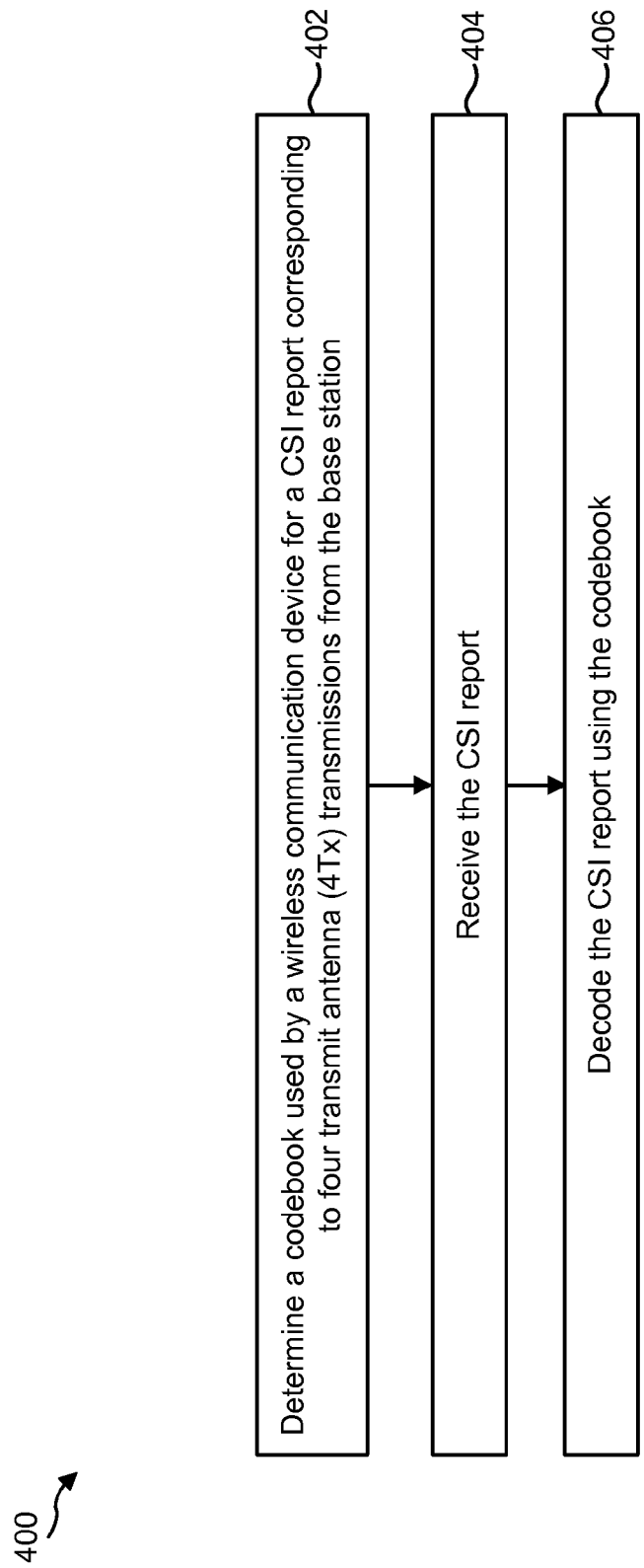
FIG. 4 is a flow diagram of a method for obtaining CSI reporting using codebook adaptation.

FIG. 4 is a flow diagram of a method 400 for obtaining CSI reporting using codebook adaptation. The method 400 may be performed by a base station 102. In one configuration, the base station 102 may use 4Tx downlink 124 transmissions to a wireless communication device 104.

The base station 102 may determine 402 a codebook 108 used by the wireless communication device 104 for a CSI report 132. In one configuration, the codebook 108 may have a dual codebook structure. For example, the codebook 108 may have a block-diagonal grid of beams (GoB) structure. A first matrix (e.g., the W1 matrix 118) may define a grid of beams for each polarization. A second matrix (e.g., the W2 matrix 120) may perform beam selection within a beam group and co-phasing.

The codebooks 108 used by the wireless communication device 104 may be predefined. For example, the wireless communication device 104 may include two or more codebooks 108, along with the parameters associated with each codebook 108. The codebooks 108 used by the wireless communication device 104 may instead be adaptable. Thus, the wireless communication device 104 may adjust any of the parameters of a codebook 108 to obtain an adapted codebook 108. The parameters of a codebook 108 may include the GoB resolution 110, the size of the beam groups 112, the overlap between beam groups 114 and/or the co-phasing accuracy 116. Each of the parameters may be individually adaptable to form the codebook 108.

As discussed above, the base station 102 may instruct the wireless communication device 104 on which codebook 108 to use (or the parameters of a codebook 108 to use). Alternatively, the base station 102 may receive an indication from the wireless communication device 104 of which codebook 108 was used.

The base station 102 may receive 404 the CSI report 132. The CSI report 132 may be received before or after the codebook 108 is determined. The CSI report 132 may include indices corresponding to the first matrix (e.g., $W_1$ matrix 118) and the second matrix (e.g., $W_2$ matrix 120), respectively.

The base station 102 may decode 406 the CSI report 132 using the codebook 108. In one configuration, decoding 406 the CSI report 132 using the codebook 108 may include determining which decoder to use to decode the CSI report 132. The base station 102 may use the decoded CSI report 132 to schedule future downlink 124 transmission to the wireless communication device 104 (including beamforming).

Figure 5:
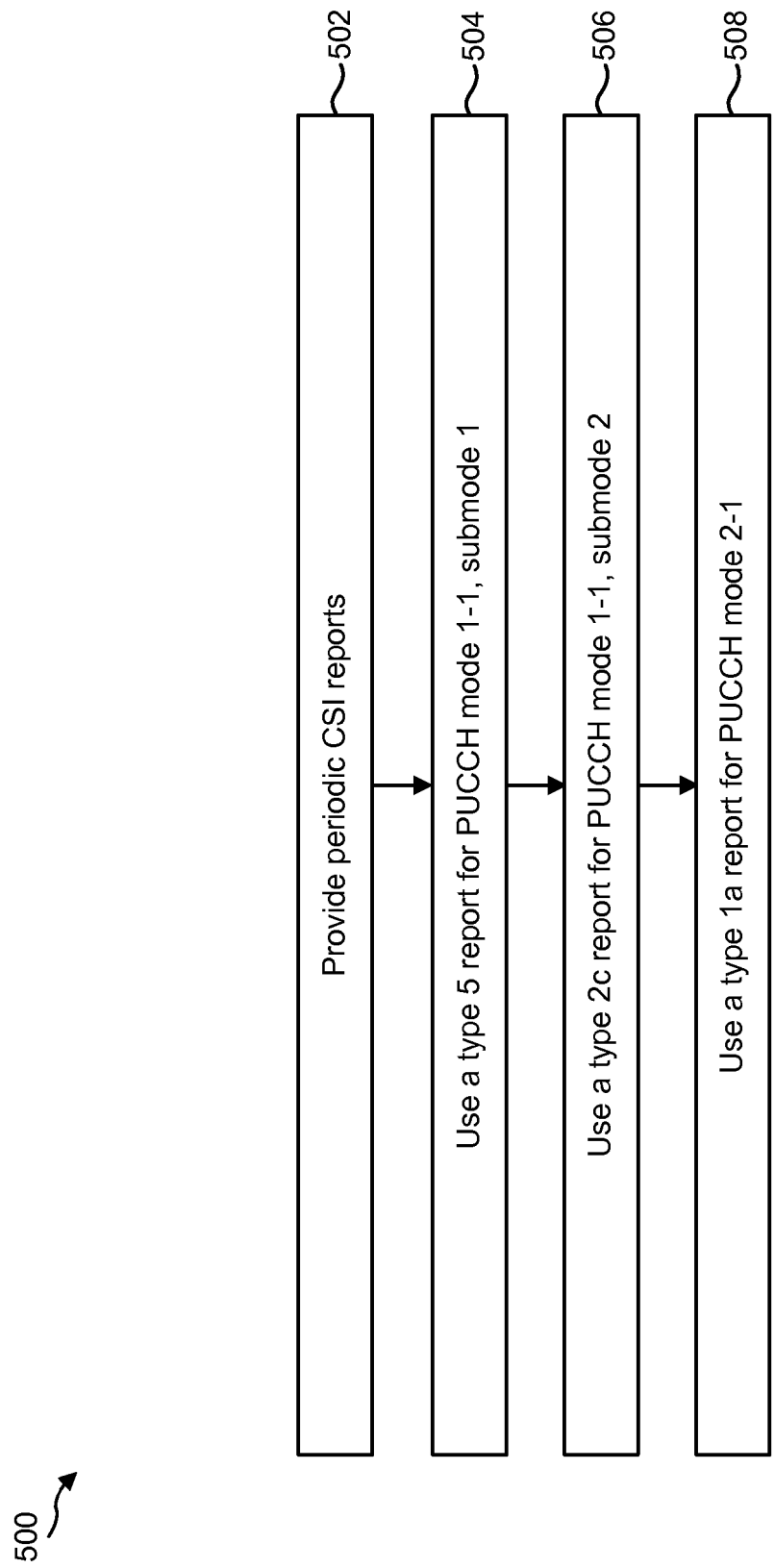
FIG. 5 is a flow diagram of a method for periodic CSI reporting using codebook adaptation.

FIG. 5 is a flow diagram of a method 500 for periodic CSI reporting using codebook adaptation. The method 500 may be performed by a wireless communication device 104. In one configuration, the wireless communication device 104 may provide 502 periodic CSI reports 132 that correspond to 4Tx downlink 124 transmissions from a base station 102 to the wireless communication device 104. Codebook adaptation may allow the wireless communication device 104 to use one or more codebooks 108 when generating a CSI report 132.

In one configuration of periodic feedback, CSI feedback may be supported based on PUCCH reporting modes 1-1 and 2-1 using the enhanced codebook 108 described herein. This may be accomplished by building upon the reporting types of 8Tx feedback reporting, which are likewise based on a dual codebook structure. However, the issue of codebook subsampling needs to be addressed for several of the reporting types in order to meet the 11 bit payload constraint.

The wireless communication device 104 may use 504 a type 5 report for a PUCCH mode 1-1, submode 1. In this reporting mode, the first PMI is reported together with the RI (RI, first PMI) as a type 5 report. For the 8Tx case, codebook subsampling is performed despite the fact that the aggregated payload remains below the total of 11 bit. In Rel-10, the subsampling was motivated by achieving higher transmission reliability. The second PMI and CQI are reported as a Type 2b report, similar to the way that reporting is performed for non-dual codebooks 108. No codebook subsampling is needed for this case.

For the enhanced 4Tx codebook 108 described herein, codebook subsampling may be performed for the type 5 (RI, first PMI) report. It may be beneficial to avoid codebook subsampling as much as possible and to perform subsampling to the extent that it removes redundant precoders that result from the dual codebook 108 structure. The presence of redundant precoders results from the concept of beam groups in which multiple subband-level PMIs are fed back assuming a single wideband precoder. However, this is not relevant for PUCCH mode 1-1, where both the first and the second PMIs are reported on a wideband basis. For example, in one configuration, every second entry of the $W_1$ codebook 108 (e.g., $W_1$ matrix 118) could be removed to avoid overlap between adjacent beam groups.

Many codebook 108 configurations may achieve a 3 bit payload for the first PMI. For 4Tx CSI reporting, this would lead to a maximum payload of 4 bits for 2-layer spatial multiplexing and 5 bits for 4-layer spatial multiplexing. These payloads are aligned with the payloads used for 8Tx feedback reporting. Payloads for PUCCH 1-1, submode 1, feedback reporting are provided in Table 3 below.

TABLE 3

| Reporting Type | | 1st PMI | RI | Total payload |
|---|---|---|---|---|
| Type 5 | 2-layer spatial multiplexing | 3 bit | 1 bit | 4 bit |
| | 4-layer spatial multiplexing | 3 bit | 2 bit | 5 bit |

The wireless communication device 104 may use 506 a type 2c report for a PUCCH mode 1-1, submode 2. In this reporting mode, the first PMI, second PMI, and CQI may be reported together as a type 2c report. This reporting mode would be desirable to avoid subsampling to the maximum extent. For rank-1, subsampling is not needed as the combined payload of 3+3 bits for the enhanced codebook 108 can still be supported (assuming removal of redundant precoders, as outlined above). Likewise, for rank-3 and rank-4, if the Rel-8 codebook 108 is reused, no subsampling is necessary.

For rank-2, the payload could be reduced to 3 bits for $W_1$ and 1 bit for $W_2$. This codebook subsampling is aligned with the 8Tx design. The 1 bit payload for $W_2$ would only perform co-phasing. A payload configuration for PUCCH 1-1, submode 2, feedback reporting is provided in Table 4.

TABLE 4

| Reporting Type | | $1^{st}$ PMI | $2^{nd}$ PMI | CQI | Total |
|---|---|---|---|---|---|
| Type 2c | RI = 1 | 3 bit | 3 bit | 4 bit | 10 bit |
| | RI = 2 | 3 bit | 1 bit | 7 bit | 11 bit |
| | 3 ≤ RI ≤ 4 | n/a | 4 bit | 7 bit | 11 bit |

The wireless communication device 104 may use 508 a type 1a report for a PUCCH mode 2-1. In this reporting mode, codebook subsampling may only be needed for reporting type 1a, which includes subband 2nd PMI information, subband CQI information and the subband (SB) label. As shown in Table 5, codebook subsampling may be performed for the RI=2 case, assuming that the Rel-8 codebook 108 is reused for rank-3 and rank-4. The subsampling for this case may be performed by either using a 1 bit $W_2$ similar to the subsampling for PUCCH 1-1, submode 2 or by using a 2 bit $W_2$ that allows for some additional beam selection. If the Rel-8 codebook 108 is reused for rank-3 and rank-4, no subsampling is needed for the Type 1a report as there is only a single PMI that can be reported in line with the existing Rel-8 reporting procedures. Furthermore, in this case, only a procedure transaction identity (PTI)=0 would be supported for rank-3 and rank-4.

TABLE 5

| Reporting Type | | $2^{nd}$ PMI | CQI | SB label | Total |
|---|---|---|---|---|---|
| Type 1a | RI=1 | 3 bit | 4 bit | 2 bit | 9 bit |
| | RI=2 | 1 or 2 bit | 7 bit | 2 bit | 10 or 11 bit |
| | 3 ≤ RI ≤ 4 | n/a | 7 bit | 2 bit | 9 bit |

In some cases, periodic CSI feedback reporting necessitates codebook subsampling to ensure that the total CSI report 132 (e.g., RI/PMI/CQI) payload does not exceed a total of 11 bits. The ability to select a beam corresponding to any beam direction after performing subsampling should be considered. For the 8Tx codebook, where adjacent $W_1$ codebook entries overlap by 2 beams, subsampling may be accomplished by retaining only every second codebook index. As Table 6 shows, doing so only removes the overlap between beam groups. Table 6 provides beam group composition for codebook types 2a/2b vs. the 8Tx codebook.

TABLE 6

| | $W_1$ codebook index i1 | | | | | | | | | | | | | | | |
|---|---|---|---|---|---|---|---|---|---|---|---|---|---|---|---|---|
| Scheme | 0 | 1 | 2 | 3 | 4 | 5 | 6 | 7 | 8 | 9 | 10 | 11 | 12 | 13 | 14 | 15 |
| Codebooks 2a/2b | 0 | 1 | 2 | 3 | 4 | 5 | 6 | 7 | 8 | 9 | 10 | 11 | 12 | 13 | 14 | 15 |
| | 8 | 9 | 10 | 11 | 12 | 13 | 14 | 15 | 16 | 17 | 18 | 19 | 20 | 21 | 22 | 23 |
| | 16 | 17 | 18 | 19 | 20 | 21 | 22 | 23 | 24 | 25 | 26 | 27 | 28 | 29 | 30 | 31 |
| | 24 | 25 | 26 | 27 | 28 | 29 | 30 | 31 | 0 | 1 | 2 | 3 | 4 | 5 | 6 | 7 |
| 8Tx codebook | 0 | 2 | 4 | 6 | 8 | 10 | 12 | 14 | 16 | 18 | 20 | 22 | 24 | 26 | 28 | 30 |
| | 1 | 3 | 5 | 7 | 9 | 11 | 13 | 15 | 17 | 19 | 21 | 23 | 25 | 27 | 29 | 31 |
| | 2 | 4 | 6 | 8 | 10 | 12 | 14 | 16 | 18 | 20 | 22 | 24 | 26 | 28 | 30 | 0 |
| | 3 | 5 | 7 | 9 | 11 | 13 | 15 | 17 | 19 | 21 | 23 | 25 | 27 | 29 | 31 | 1 |

With the enhanced codebook 108 (e.g., Codebooks 2a/2b) shown in Table 6, adjacent $W_1$ codebook entries do not overlap by 2 beams. Therefore, selecting every second codebook entry may not allow for the selection of certain beam directions. However, selecting the first half of codebook entries preserves the possibility of selecting any of the 32 beams in the codebook. This may motivate a different subsampling compared to the 8Tx codebook.

For codebook subsampling for PUCCH mode 1-1, submode 1, $W_1$ may be reported together with the RI as a type 5 report, as described above. For the 8Tx case, codebook subsampling may be performed to remove redundant precoders from the $W_1$ codebook. A similar approach may be performed for the enhanced codebook 108 as well, although differences in the $W_2$ codebook (i.e., the α-offsets) may lead to different overall precoders between beam groups that contain the same set of beams but with a different ordering (e.g., entries 0 and 8 in Table 6). The α factor may allow for a finer co-phasing granularity that is jointly encoded with the beam selection.

It may be beneficial to avoid codebook subsampling as much as possible. However, codebook subsampling may be considered to the extent that codebook subsampling removes beam groups with the same set of beams. This is illustrated in Table 7, which shows that the beam groups associated with first PMI index i1 and index i1+8 include the same beams, though not in the same order.

TABLE 7

| | $W_1$ codebook index i1 | | | | | | | | | | | | | | | |
|---|---|---|---|---|---|---|---|---|---|---|---|---|---|---|---|---|
| Scheme | 0 | 1 | 2 | 3 | 4 | 5 | 6 | 7 | 8 | 9 | 10 | 11 | 12 | 13 | 14 | 15 |
| Beams per beam group | 0 | 1 | 2 | 3 | 4 | 5 | 6 | 7 | 8 | 9 | 10 | 11 | 12 | 13 | 14 | 15 |
| | 8 | 9 | 10 | 11 | 12 | 13 | 14 | 15 | 16 | 17 | 18 | 19 | 20 | 21 | 22 | 23 |
| | 16 | 17 | 18 | 19 | 20 | 21 | 22 | 23 | 24 | 25 | 26 | 27 | 28 | 29 | 30 | 31 |
| | 24 | 25 | 26 | 27 | 28 | 29 | 30 | 31 | 0 | 1 | 2 | 3 | 4 | 5 | 6 | 7 |

In one configuration, the codebook entries in Table 7 for the beams per beam group corresponding to $W_1$ codebook index i1 0-7 may be selected, while the codebook entries for the beams per beam group corresponding to $W_1$ codebook index i1 8-15 may be pruned.

Alternatively, to avoid subsampling and fully use the enhanced codebook 108, codebook subset restriction may be employed in an implementation-specific way to achieve the benefit of improved reliability when needed. In some configurations, codebook subset restriction may provide a way for a base station 102 to restrict the set of codebooks 108 and/or ranks that the wireless communication device 104 can assume for CSI feedback. While codebook subset restriction does not reduce the transmission payload itself, codebook subset restriction leads to known bits at the network when decoding the CSI report 132 of a wireless communication device 104. This knowledge of a subset of bits can be exploited in the decoding process to detect the report more reliably.

For codebook subsampling for PUCCH mode 1-1, submode 2, $W_1$ and $W_2$ may be reported together as a Type 2c report. Subsampling may be unavoidable in this case, but it may be desirable to limit the amount of subsampling as much as possible. Due to the increased CQI payload for ranks larger than one, the subsampling may depend on the transmission rank.

For rank-1, 7 bits are available for carrying PMI (4 bits are needed for the CQI). A total of 3 bits may be allocated to $W_1$ by removing duplicate beam groups as shown in Table 7. The remaining 4 bits may be used for feeding back $W_2$ without further subsampling.

For rank-2, 4 bits are available for carrying PMI (7 bits are needed for CQI and differential CQI). These 4 bits may be allocated according to two options. In a first option, 2 bits may be allocated to $W_1$, which allows the selection of beam groups as shown in the upper half of Table 8. The remaining 2 bits may be allocated to $W_2$. 1 of the 2 remaining bits allocated to $W_2$ may select either the first or third beam in the beam group, and the other bit selects the co-phasing (e.g., either '0' or '-1'). Table 8 illustrates two options for codebook subsampling for PUCCH 1-1, submode 2, reporting type 2c.

TABLE 8

| | | $W_1$ codebook index i1 | | | | | | | | | | | | | | | |
|---|---|---|---|---|---|---|---|---|---|---|---|---|---|---|---|---|---|
| Scheme | | 0 | 1 | 2 | 3 | 4 | 5 | 6 | 7 | 8 | 9 | 10 | 11 | 12 | 13 | 14 | 15 |
| Opt-1 | | <u>0</u> | 1 | 2 | 3 | <u>4</u> | 5 | 6 | 7 | <u>8</u> | 9 | 10 | 11 | <u>12</u> | 13 | 14 | 15 |
| | | 8 | 9 | 10 | 11 | 12 | 13 | 14 | 15 | 16 | 17 | 18 | 19 | 20 | 21 | 22 | 23 |
| | | <u>16</u> | 17 | 18 | 19 | <u>20</u> | 21 | 22 | 23 | <u>24</u> | 25 | 26 | 27 | <u>28</u> | 29 | 30 | 31 |
| | | 24 | 25 | 26 | 27 | 28 | 29 | 30 | 31 | 0 | 1 | 2 | 3 | 4 | 5 | 6 | 7 |

TABLE 8-continued

| | W₁ codebook index i1 | | | | | | | | | | | | | | | |
|---|---|---|---|---|---|---|---|---|---|---|---|---|---|---|---|---|
| Scheme | 0 | 1 | 2 | 3 | 4 | 5 | 6 | 7 | 8 | 9 | 10 | 11 | 12 | 13 | 14 | 15 |
| Opt-2 | <u>0</u> | 1 | <u>2</u> | 3 | <u>4</u> | 5 | <u>6</u> | 7 | <u>8</u> | 9 | <u>10</u> | 11 | <u>12</u> | 13 | <u>14</u> | 15 |
| | 8 | 9 | 10 | 11 | 12 | 13 | 14 | 15 | 16 | 17 | 18 | 19 | 20 | 21 | 22 | 23 |
| | <u>16</u> | 17 | <u>18</u> | 19 | <u>20</u> | 21 | <u>22</u> | 23 | <u>24</u> | 25 | <u>26</u> | 27 | <u>28</u> | 29 | <u>30</u> | 31 |
| | 24 | 25 | 26 | 27 | 28 | 29 | 30 | 31 | 0 | 1 | 2 | 3 | 4 | 5 | 6 | 7 |

In one configuration, the underlined codebook entries in Table 8 denote selected codebook entries. The remaining codebook entries in Table 8 (e.g., non-underlined codebook entries) denote pruned codebook entries.

In a second option, 3 bits may be allocated to $W_1$, which allows selecting the beam groups as shown in the bottom half of Table 8. The remaining 1 bit may be used to perform beam selection of either the first or third beam in the beam group. No co-phasing selection is performed with this option.

The above configurations for codebook subsampling for PUCCH mode 1-1, submode 2 ensure that the codebook is uniformly subsampled across the 32 beams contained in the codebook.

For codebook subsampling for PUCCH mode 2-1, codebook subsampling is only required for reporting type 1a, which includes subband $W_2$, subband CQI and the subband selection label. The subsampling may depend on the rank. For rank-1, subsampling can be avoided entirely due to the comparatively smaller CQI payload (as in the case for 8Tx feedback reporting).

For rank-2, 2 bits are available to carry the $W_2$ PMI payload. Similar to 8Tx feedback reporting, two bits may be used for conveying the beam selection information. For example, the subsampling scheme may select the pairs $(e_1,e_1)$, $(e_2,e_2)$, $(e_3,e_3)$, and $(e_4,e_4)$, all with the first co-phasing option of Equation (1).

$$W_{2,n} \in \left\{ \frac{1}{2}\begin{bmatrix} Y_1 & Y_2 \\ Y_1 & -Y_2 \end{bmatrix}, \frac{1}{2}\begin{bmatrix} Y_1 & Y_2 \\ jY_1 & -jY_2 \end{bmatrix} \right\} \quad (1)$$

and $$(Y_1, Y_2) = (e_i, e_k) \in \{(e_1, e_1), (e_2, e_2), (e_3, e_3), (e_4, e_4)\}$$

In Equation (1), the e term represents a beam in a beam group in $W_1$. For example, if there are four beams in a beam group in $W_1$, the four beams can be represented by $e_1$, $e_2$, $e_3$, and $e_4$.

For ranks-3 and 4, the 4Tx codebook 108 may reuse the Rel-8 codewords for ranks-3 and 4. As for ranks-1 and 2, the PMI payload needs to be reduced from 4 bits to 2 bits. The Rel-8 4Tx codebook 108 includes several groups of codewords that target different antenna configurations. As a focus of the enhanced codebook 108 is on a cross-polarized antenna configuration, the codewords that are aligned with this antenna configuration may be retained in the Rel-8 codebook 108. In particular, the last 4 entries in the 4Tx codebook 108 (i.e., entries 12-15), which correspond to this antenna configuration, may be retained for PUCCH 2-1 reporting.

Figure 6:
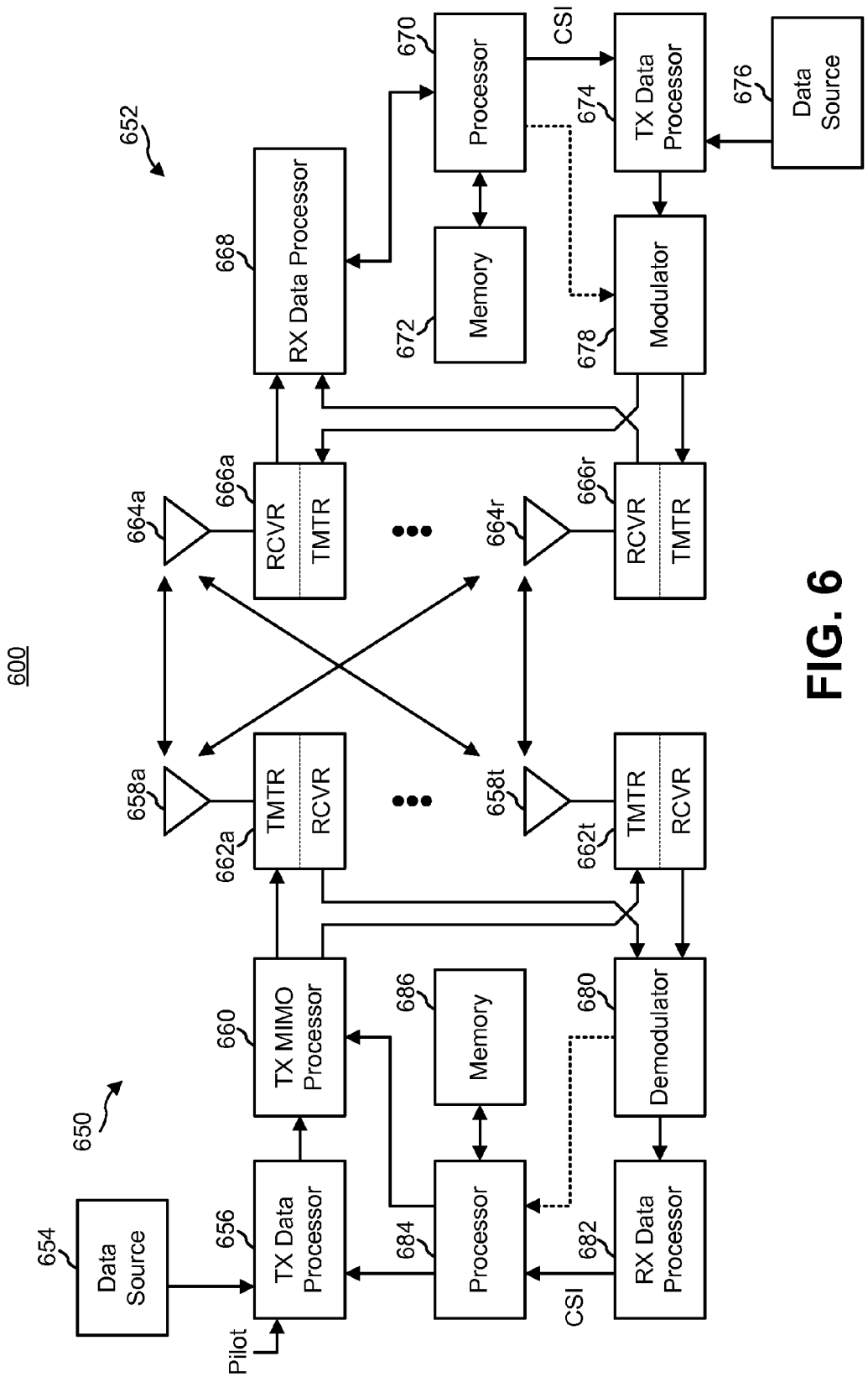
FIG. 6 is a block diagram of a transmitter and receiver in a MIMO system.

FIG. 6 is a block diagram of a transmitter 650 and receiver 652 in a MIMO system 600. In some implementations, the transmitter 650 may be implemented in one or more of the base stations 102. In some implementations, the receiver 652 may be implemented in one or more of the wireless communication devices 104 and base station 102. In the transmitter 650, traffic data for a number of data streams is provided from a data source 654 to a transmit (TX) data processor 656. Each data stream may then be transmitted over a respective transmit antenna 658a-t. The transmit (TX) data processor 656 may format, code, and interleave the traffic data for each data stream based on a particular coding scheme selected for that data stream to provide coded data.

The coded data for each data stream may be multiplexed with pilot data (e.g., reference signals) using orthogonal frequency-division multiplexing (OFDM) techniques. The pilot data may be a known data pattern that is processed in a known manner and used at the receiver 652 to estimate the channel response. The multiplexed pilot and coded data for each stream is then modulated (i.e., symbol mapped) based on a particular modulation scheme (e.g., binary phase shift keying (BPSK), quadrature phase shift keying (QPSK), multiple phase shift keying (M-PSK) or multi-level quadrature amplitude modulation (M-QAM)) selected for that data stream to provide modulation symbols. The data rate, coding and modulation for each data stream may be determined by instructions performed by a processor.

The modulation symbols for all data streams may be provided to a transmit (TX) multiple-input multiple-output (MIMO) processor 660, which may further process the modulation symbols (e.g., for OFDM). The transmit (TX) multiple-input multiple-output (MIMO) processor 660 then provides NT modulation symbol streams to NT transmitters (TMTR) 662a through 662t. The TX transmit (TX) multiple-input multiple-output (MIMO) processor 660 may apply beamforming weights to the symbols of the data streams and to the antenna 658 from which the symbol is being transmitted.

Each transmitter 662 may receive and process a respective symbol stream to provide one or more analog signals, and further condition (e.g., amplify, filter, and upconvert) the analog signals to provide a modulated signal suitable for transmission over the MIMO channel. NT modulated signals from transmitters 662a through 662t are then transmitted from NT antennas 658a through 658t, respectively.

At the receiver 652, the transmitted modulated signals are received by NR antennas 664a through 664r, and the received signal from each antenna 664 is provided to a respective receiver (RCVR) 666a through 666r. Each receiver 666 may condition (e.g., filter, amplify, and downconvert) a respective received signal, digitize the conditioned signal to provide samples, and further process the samples to provide a corresponding "received" symbol stream.

An RX data processor 668 then receives and processes the NR received symbol streams from NR receivers 666 based on a particular receiver processing technique to provide NT "detected" symbol streams. The RX data processor 668 then demodulates, deinterleaves and decodes each detected symbol stream to recover the traffic data for the data stream. The processing by RX data processor 668 may be complementary to that performed by TX MIMO processor 660 and TX data processor 656 at transmitter system 650.

A processor 670 may periodically determine which precoding matrix to use. The processor 670 may store information on and retrieve information from memory 672. The processor 670 formulates a reverse link message comprising a matrix index portion and a rank value portion. The reverse link message may be referred to as channel state information (CSI). The reverse link message may comprise various types of information regarding the communication link and/or the received data stream. The reverse link message is then processed by a TX data processor 674, which also receives traffic data for a number of data streams from a data source 676, modulated by a modulator 678, conditioned by transmitters 666a through 666r, and transmitted back to the transmitter 650.

At the transmitter 650, the modulated signals from the receiver are received by antennas 658, conditioned by receivers 662, demodulated by a demodulator 680 and processed by an RX data processor 682 to extract the reverse link message transmitted by the receiver system 652. A processor 684 may receive channel state information (CSI) from the RX data processor 682. The processor 684 may store information on and retrieve information from memory 686. The processor 684 then determines which pre-coding matrix to use for determining the beamforming weights and then processes the extracted message.

Figure 7:
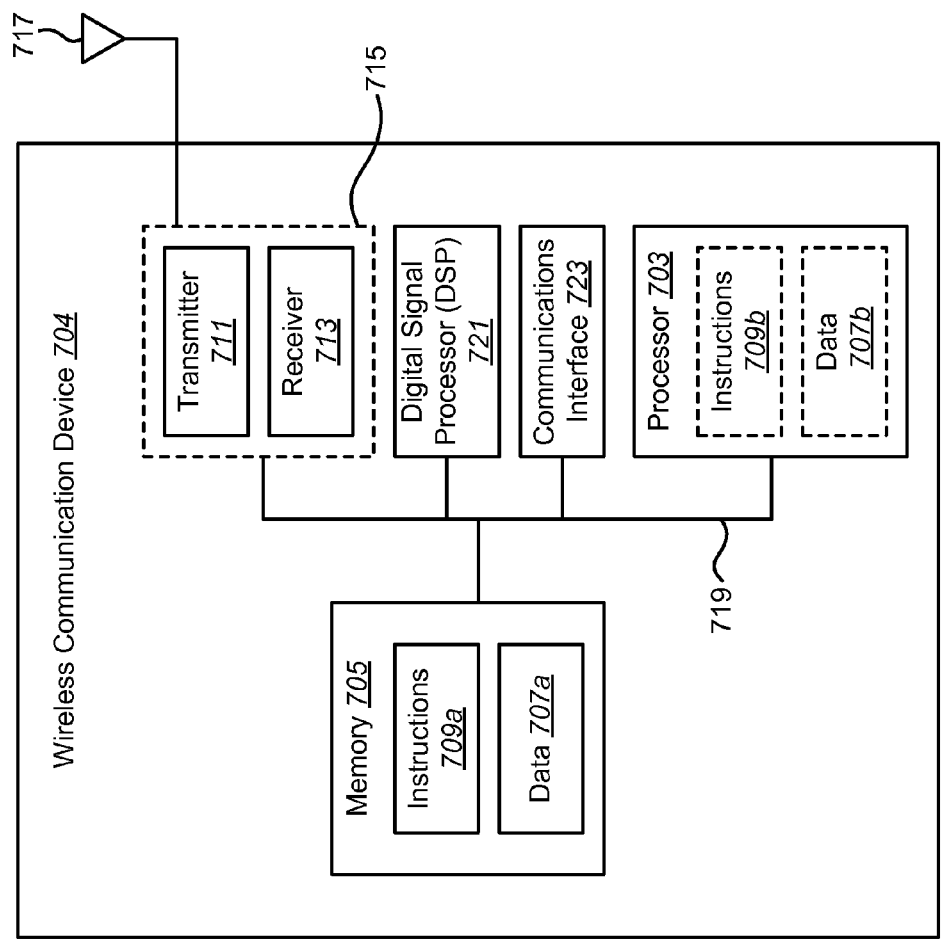
FIG. 7 illustrates certain components that may be included within a wireless communication device.

FIG. 7 illustrates certain components that may be included within a wireless communication device 704. The wireless communication device 704 may be an access terminal, a mobile station, a user equipment (UE), etc. The wireless communication device 704 includes a processor 703. The processor 703 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 703 may be referred to as a central processing unit (CPU). Although just a single processor 703 is shown in the wireless communication device 704 of FIG. 7, in an alternative configuration, a combination of processors (e.g., an ARM and DSP) could be used.

The wireless communication device 704 also includes memory 705. The memory 705 may be any electronic component capable of storing electronic information. The memory 705 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Data 707a and instructions 709a may be stored in the memory 705. The instructions 709a may be executable by the processor 703 to implement the methods disclosed herein. Executing the instructions 709a may involve the use of the data 707a that is stored in the memory 705. When the processor 703 executes the instructions 709a, various portions of the instructions 709b may be loaded onto the processor 703, and various pieces of data 707b may be loaded onto the processor 703.

The wireless communication device 704 may also include a transmitter 711 and a receiver 713 to allow transmission and reception of signals to and from the wireless communication device 704. The transmitter 711 and receiver 713 may be collectively referred to as a transceiver 715. An antenna 717 may be electrically coupled to the transceiver 715. The wireless communication device 704 may also include (not shown) multiple transmitters, multiple receivers, multiple transceivers and/or additional antennas.

The wireless communication device 704 may include a digital signal processor (DSP) 721. The wireless communication device 704 may also include a communications interface 723. The communications interface 723 may allow a user to interact with the wireless communication device 704.

The various components of the wireless communication device 704 may be coupled together by one or more buses, which may include a power bus, a control signal bus, a status signal bus, a data bus, etc. For the sake of clarity, the various buses are illustrated in FIG. 7 as a bus system 719.

Figure 8:
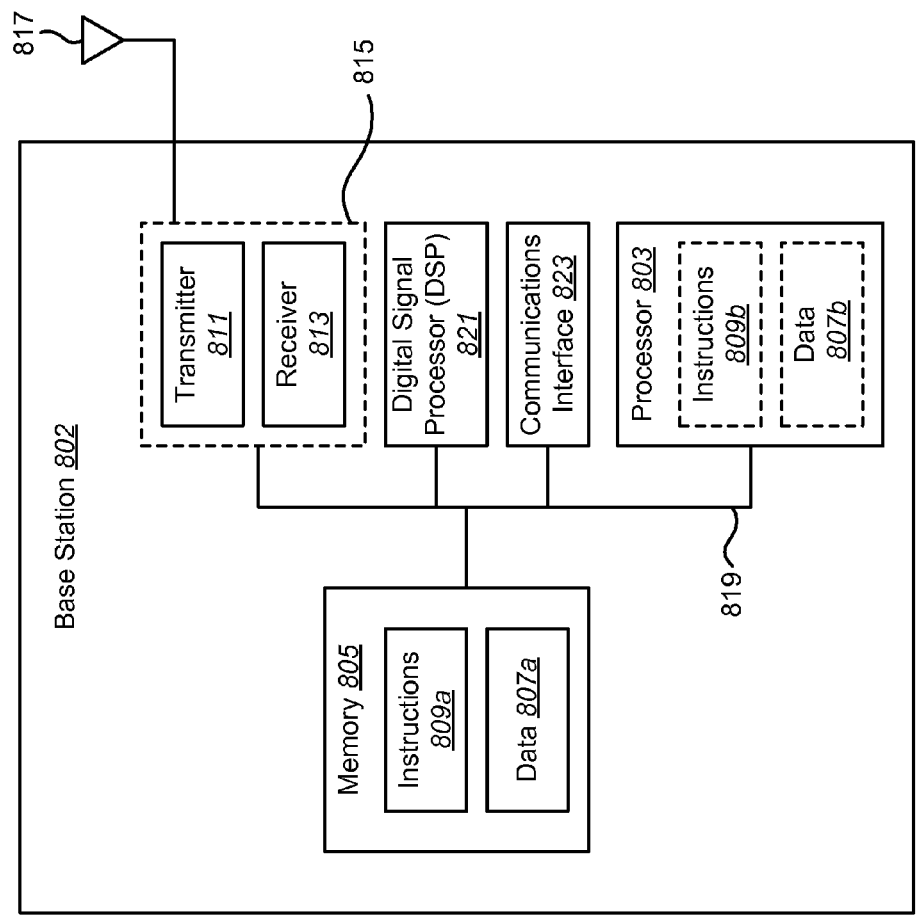
FIG. 8 illustrates certain components that may be included within a base station.

FIG. 8 illustrates certain components that may be included within a base station 802. A base station 802 may also be referred to as, and may include some or all of the functionality of, an access point, a broadcast transmitter, a NodeB, an evolved NodeB, etc. The base station 802 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the base station 802 of FIG. 8, in an alternative configuration, a combination of processors (e.g., an ARM and DSP) could be used.

The base station 802 also includes memory 805. The memory 805 may be any electronic component capable of storing electronic information. The memory 805 may be embodied as random access memory (RAM), read-only memory (ROM), magnetic disk storage media, optical storage media, flash memory devices in RAM, on-board memory included with the processor, EPROM, EEPROM, registers and so forth, including combinations thereof.

Data 807a and instructions 809a may be stored in the memory 805. The instructions 809a may be executable by the processor 803 to implement the methods disclosed herein. Executing the instructions 809a may involve the use of the data 807a that is stored in the memory 805. When the processor 803 executes the instructions 809a, various portions of the instructions 809b may be loaded onto the processor 803, and various pieces of data 807b may be loaded onto the processor 803.

The base station 802 may also include a transmitter 811 and a receiver 813 to allow transmission and reception of signals to and from the base station 802. The transmitter 811 and receiver 813 may be collectively referred to as a transceiver 815. An antenna 817 may be electrically coupled to the transceiver 815. The base station 802 may also include (not shown) multiple transmitters, multiple receivers, multiple transceivers and/or additional antennas.

The base station 802 may include a digital signal processor (DSP) 821. The base station 802 may also include a communications interface 823. The communications interface 823 may allow a user to interact with the base station 802.

The various components of the base station 802 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 4 and 5 can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for channel state information (CSI) reporting by a base station, comprising:
   determining a codebook used by a wireless communication device for a CSI report corresponding to four transmit antenna (4Tx) transmissions from the base station, wherein the codebook has a dual codebook structure comprising a block-diagonal grid of beams structure $W=W_1 \cdot W_2$, wherein $W_1$ is a first matrix that is reported on a wideband basis, wherein $W_2$ is a second matrix that is reported on a subband basis;
   receiving the CSI report as a type 5 report in physical uplink control channel (PUCCH) mode 1-1, submode 1, wherein the type 5 report uses 1 bit to represent a rank indicator for maximum 2-layer spatial multiplexing and 2 bits to represent the rank indicator for maximum 4-layer spatial multiplexing; and
   decoding the CSI report using the codebook.

2. The method of claim 1, wherein the first matrix ($W_1$) defines a grid of beams for each polarization, and wherein the second matrix ($W_2$) performs beam selection within a beam group and co-phasing.

3. The method of claim 1, wherein the codebook is determined based on at least one of a grid of beam resolution, a size of beam groups, an overlap between beam groups, and a co-phasing accuracy.

4. The method of claim 3, wherein each parameter used to generate the codebook is individually adaptable.

5. The method of claim 1, further comprising signaling the codebook using signaling based on at least one of explicit bits, dynamic parameters and semi-static parameters.

6. The method of claim 1, wherein the wireless communication device determines which of multiple configured codebooks should be used for CSI reporting.

7. The method of claim 1, wherein multiple user channel quality indicator hypotheses remain separate from codebook adaptation.

8. The method of claim 1, wherein multiple user channel quality indicator hypotheses follow codebook adaptation.

9. The method of claim 1, further comprising performing codebook subsampling to meet an 11 bit payload constraint for the CSI report.

10. A base station for channel state information (CSI) reporting, comprising:
  a processor;
  memory in electronic communication with the processor; and
  instructions stored in the memory, the instructions being executable by the processor to:
    determine a codebook used by a wireless communication device for a CSI report corresponding to four transmit antenna (4Tx) transmissions from the base station, wherein the codebook has a dual codebook structure comprising a block-diagonal grid of beams structure $W=W_1 \cdot W_2$, wherein $W_1$ is a first matrix that is resorted on a wideband basis wherein $W_2$ is a second matrix that is reported on a subband basis;
    receive the CSI report as a type 5 report in physical uplink control channel (PUCCH) mode 1-1, submode 1, wherein the type 5 report uses 1 bit to represent a rank indicator for maximum 2-layer spatial multiplexing and 2 bits to represent the rank indicator for maximum 4-layer spatial multiplexing; and
    decoding the CSI report using the codebook.

11. The base station of claim 10, wherein the codebook is determined based on at least one of a grid of beam resolution, a size of beam groups, an overlap between beam groups, and a co-phasing accuracy.

12. The base station of claim 11, wherein each parameter used to generate the codebook is individually adaptable.

13. The base station of claim 10, further comprising instructions executable to signal the codebook using signaling based on at least one of explicit bits, dynamic parameters and semi-static parameters.

14. The base station of claim 10, wherein the wireless communication device determines which of multiple configured codebooks should be used for CSI reporting.

15. A base station for channel state information (CSI) reporting, comprising:
  means for determining a codebook used by a wireless communication device for a CSI report corresponding to four transmit antenna (4Tx) transmissions from the base station, wherein the codebook has a dual codebook structure comprising a block-diagonal grid of beams structure $W=W_1 \cdot W_2$, wherein $W_1$ is a first matrix that is resorted on a wideband basis wherein $W_2$ is a second matrix that is reported on a subband basis;
  means for receiving the CSI report as a type 5 report in physical uplink control channel (PUCCH) mode 1-1, submode 1, wherein the type 5 report uses 1 bit to represent a rank indicator for maximum 2-layer spatial multiplexing and 2 bits to represent the rank indicator for maximum 4-layer spatial multiplexing; and
  means for decoding the CSI report using the codebook.

16. A computer-program product for channel state information (CSI) reporting, the computer-program product comprising a non-transitory computer-readable medium having instructions thereon, the instructions comprising:
  code for causing a base station to determine a codebook used by a wireless communication device for a CSI report corresponding to four transmit antenna (4Tx) transmissions from the base station, wherein the codebook has a dual codebook structure comprising a block-diagonal grid of beams structure $W=W_1 \cdot W_2$, wherein $W_1$ is a first matrix that is resorted on a wideband basis wherein $W_2$ is a second matrix that is reported on a subband basis;
  code for causing the base station to receive the CSI report as a type 5 report in physical uplink control channel (PUCCH) mode 1-1, submode 1, wherein the type 5 report uses 1 bit to represent a rank indicator for maximum 2-layer spatial multiplexing and 2 bits to represent the rank indicator for maximum 4-layer spatial multiplexing;
  code for causing the base station to decode the CSI report using the codebook.

* * * * *